Feb. 24, 1942.        A. B. CHANCE        2,274,528
POLE GUYING FIXTURE
Filed Aug. 17, 1940        4 Sheets-Sheet 1
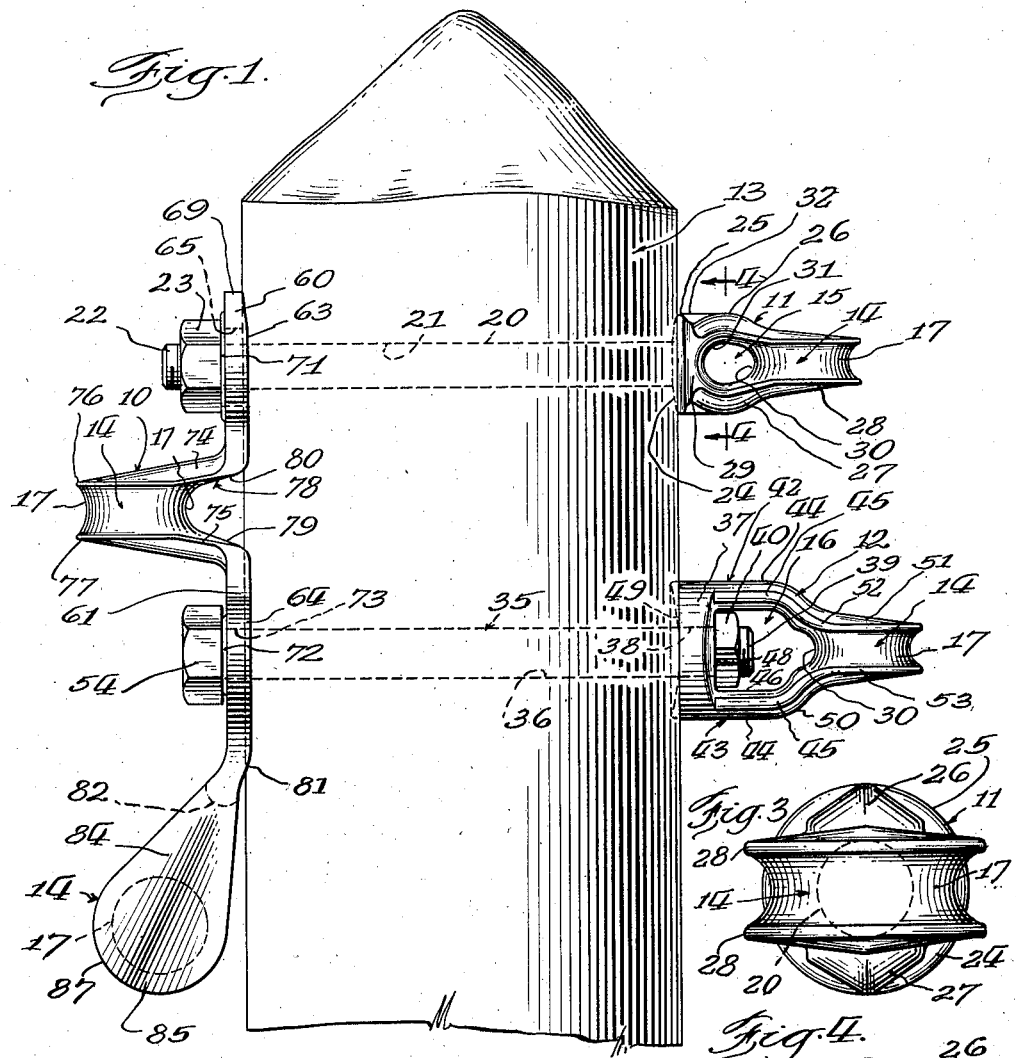
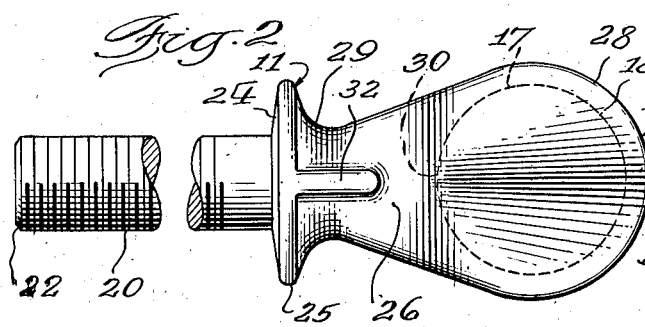
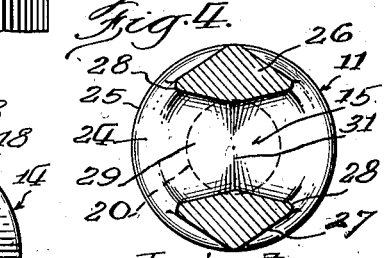
Inventor:
Albert B. Chance

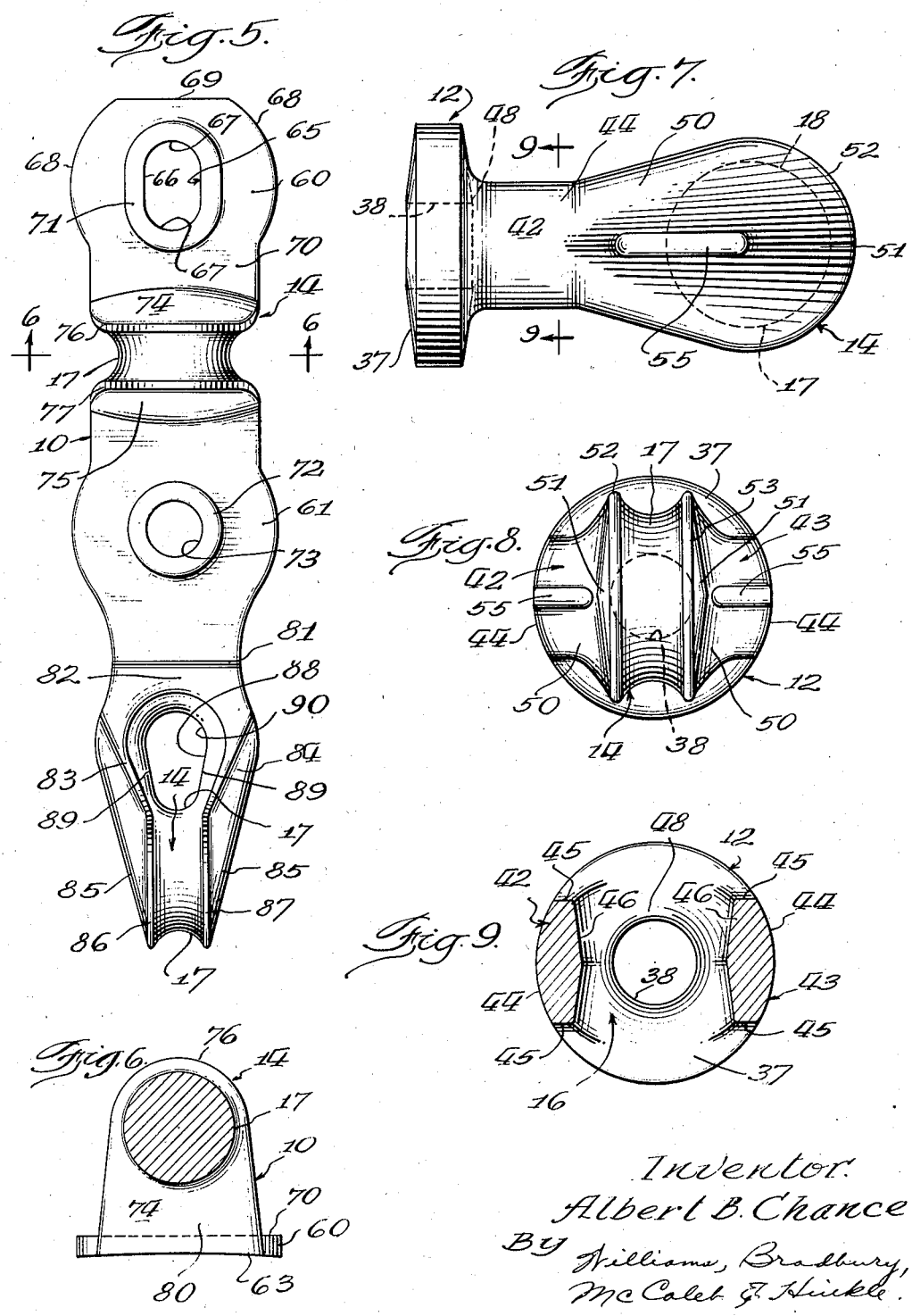
Feb. 24, 1942.  A. B. CHANCE  2,274,528
POLE GUYING FIXTURE
Filed Aug. 17, 1940  4 Sheets-Sheet 2
Inventor:
Albert B. Chance Feb. 24, 1942. A. B. CHANCE 2,274,528
POLE GUYING FIXTURE
Filed Aug. 17, 1940 4 Sheets-Sheet 3
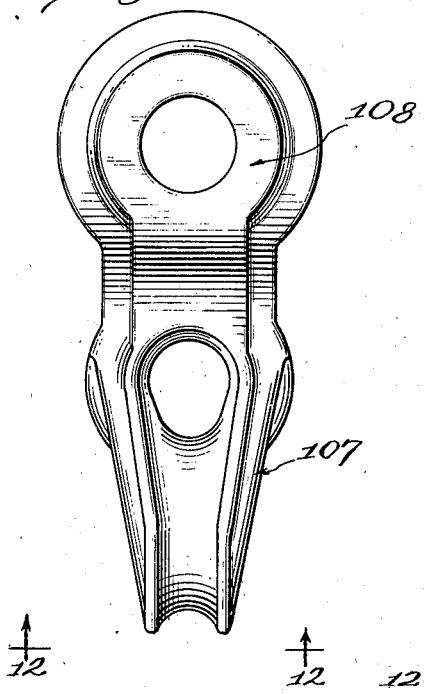
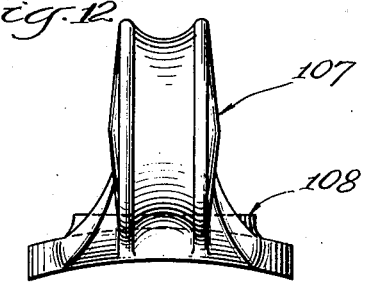
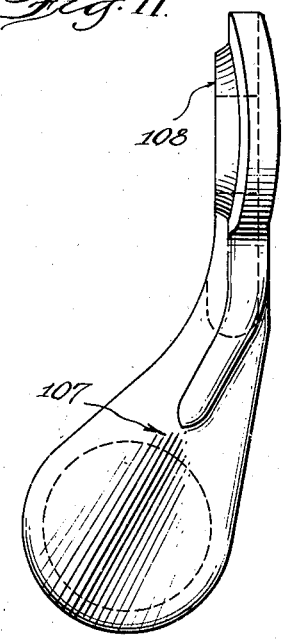
Inventor:
Albert B. Chance
By Williams, Bradbury,
McCaleb & Hinkle
Attys.

Feb. 24, 1942.  A. B. CHANCE  2,274,528
POLE GUYING FIXTURE
Filed Aug. 17, 1940   4 Sheets-Sheet 4
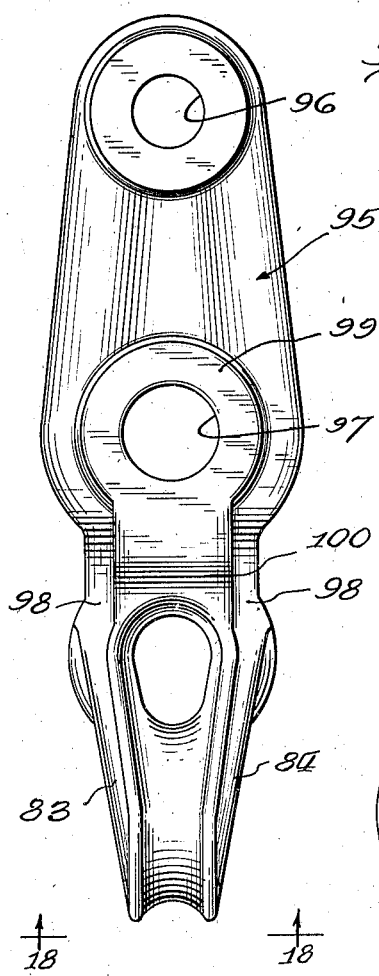
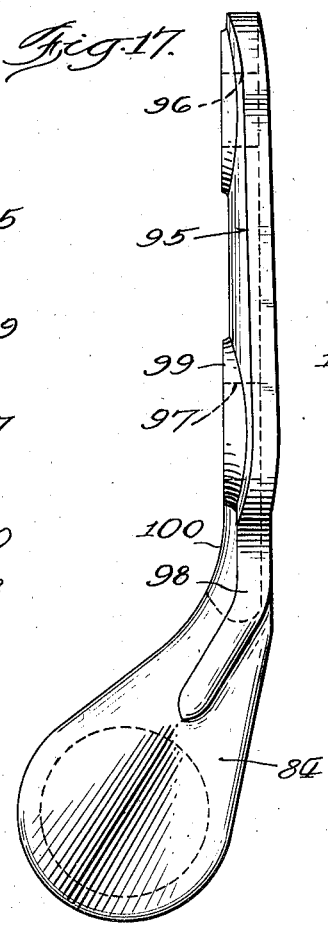
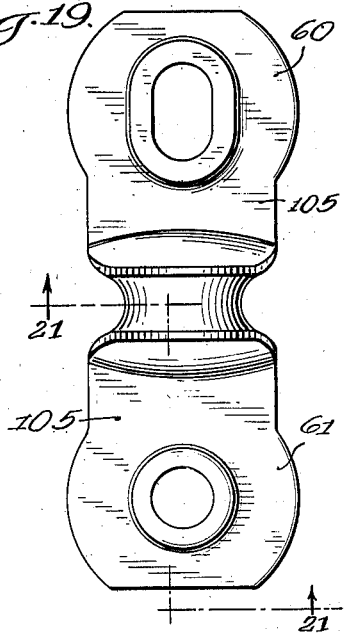
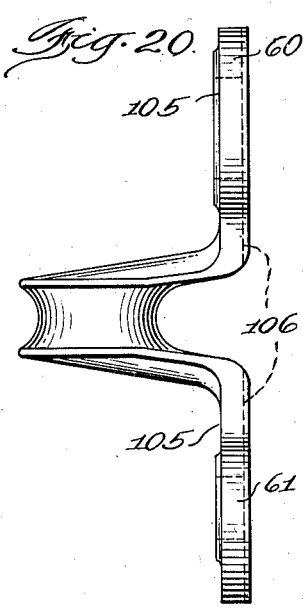
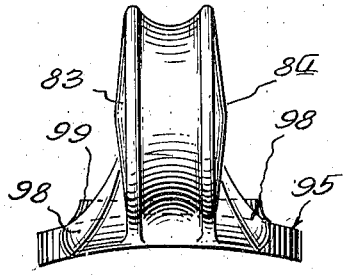
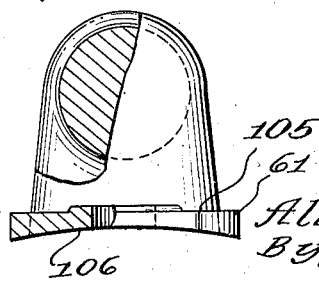
Inventor:
Albert B. Chance Patented Feb. 24, 1942

2,274,528

UNITED STATES PATENT OFFICE 2,274,528

POLE GUYING FIXTURE

Albert B. Chance, Centralia, Mo., assignor to A. B. Chance Company, Centralia, Mo., a corporation of Missouri Application August 17, 1940, Serial No. 353,005

13 Claims. (Cl. 24—115)

The present invention relates to pole guying fixtures, and is particularly concerned with the provision of pole guying fixtures which are improvements over my prior Patents Nos. 1,804,202, issued May 5, 1931, Pole guying fixtures, and 1,813,482, issued July 7, 1931, Pole guy fixtures.

One of the objects of the present invention is the provision of a plurality of improved types of pole guying fixtures which are adapted to be used for securing guys of all kinds, such as messengers, head guys, back guys, etc., to poles or the like.

Another object of the invention is the provision of improved pole guy fixtures which are adapted to prevent excessively sharp curves of the cable at the fixture, and consequently to prevent the excessive strains which are induced by sharp bends in the cable, and in which the cable is adapted to extend from the fixture at any desired angle in the same plane.

Another object of the invention is the provision of improved pole guy fixtures which are adapted to prevent flattening of the cable under lateral pressure of the cable at the fixture, thereby tending to equalize the strains in the parts of the cable which engage the fixture and which are adapted to accomplish this result, irrespective of the angle at which the cable extends from the fixture.

Another object of the invention is the provision of improved pole guy fixtures which are adapted to maintain the circular shape of the cable at the fixture and to tend toward equalization of the strains in the various strands of the cable, while permitting the cable to be attached to the fixture at any of a multiplicity of different angles in substantially the same plane.

Another object of the invention is the provision of such improved pole guy fixtures which are adapted to be economically manufactured and which are stronger and more durable than the devices of the prior art and which are capable of a wider variety of uses.

Other objects and advantages of the invention will be apparent from the following description and the accompanying drawings, in which similar characters of reference indicate similar parts throughout the several views.

Referring to the four sheets of drawings,

Fig. 1 is a side elevational view of a pole top equipped with pole guying fixtures constructed according to the invention;

Fig. 2 is a plan view of the top of the pole guy fixture which is utilized at the top right of Fig. 1;

Fig. 3 is an end elevational view of the pole guy fixture disclosed at the top right of Fig. 1;

Fig. 4 is a vertical sectional view, taken on the plane of the line 4—4 of Fig. 1;

Fig. 5 is a front elevational view of the pole guy fixture utilized at the top left of Fig. 1;

Fig. 6 is a horizontal sectional view taken on the plane of the line 6—6 of Fig. 5, looking in the direction of the arrows;

Fig. 7 is a side elevational view of a pole guy fixture of a modified form adapted to be secured to a guy rod by means of a threaded end and a nut;

Fig. 8 is an end elevational view of the fixture of Fig. 7;

Fig. 9 is a sectional view, taken on the plane of the line 9—9 of Fig. 7;

Fig. 10 is a front elevational view of another modified form of pole guying fixture embodying the lower half of the fixture shown at the left hand part of Fig. 1;

Fig. 11 is a side elevational view of the fixture of Fig. 10;

Fig. 12 is a bottom elevational view of the fixture of Figs. 10 and 11;

Fig. 13 is a side elevational view of another type of fixture, which is adapted to be secured to the threaded end of a guy rod;

Fig. 14 is a longitudinal sectional view, taken on the plane of the line 14—14 of Fig. 13, looking in the direction of the arrows.

Fig. 15 is a fragmentary sectional view, taken on the plane of the line 15—15, looking in the direction of the arrows;

Fig. 16 is a front elevational view of another modified form of fixture;

Fig. 17 is a side elevational view of the same fixture;

Fig. 18 is a bottom end view, taken on the plane of the line 18—18 of Fig. 16;

Fig. 19 is a front elevational view of another modified form of fixture;

Fig. 20 is a side elevational view of this fixture; and

Fig. 21 is a fragmentary sectional view, taken on the plane of the line 21—21 of Fig. 19.

Referring to the drawings of Figs. 1 to 4, the present guying fixtures are exemplified in three different types of fixtures, indicated in their entireties by the numerals 10, 11, and 12, carried by the pole top 13.

One of the most important features of all of these fixtures is the provision of an improved cable engaging yoke 14, which may be formed as a part of an eye, such as, for example, the eye 15 of the fixture 11, or the eye 16 of the fixture 12, or it may form a part of a fixture not having an eye, as illustrated at 10, in Fig. 1.

This cable-engaging yoke is preferably formed with a groove 17, which is substantially partially circular in cross section and adapted to fit the circular outside of the cable, which is to be used with the fixtures.

The sides of the circular groove 17 are thus adapted to engage the sides of the cable over a predetermined portion of the periphery of the cable, and to support these sides so that there is a tendency toward the elimination of the flattening of the cable.

The maintenance of the cable in substantially circular cross sectional shape tends to equalize the strains in the various strands of the cable, and increases its effective strength.

The cable-supporting groove 17, which embraces the yoke 14 in the present fixtures, preferably extends all the way around the yoke portion 14, and describes a complete circle 18, as shown in Fig. 2. This renders the groove 17 partially toroidal in shape, and the diameter of the circle 18 of the yoke 14 is preferably larger and generally several times larger than the diameter of the cable with which it is used.

This renders the bend in the cable, which occurs about the yoke 14, a relatively easy bend, as distinguished from a sharp bend, and further tends to equalize the strain between the different strands of the cable. Where such cables have their strands twisted so that parts of each strand are at times located on the outside and at other times on the inside of the cable, the equalization of tension on the strands is further benefited, and the result is a form of cable attachment in which the strength of the cable at the point of engagement with the yoke is at a maximum.

It should be noted that since the partially circular groove 17 extends all the way around the yoke 14, and the yoke is circular in shape, a cable may extend from the fixture at any angle in a plane which lies within the centers of the curves on which the circular groove 17 is constructed, without any change in the characteristics of the engagement between the cable and the fixture. The plane of the two parts of the cable leading from the fixture may even vary considerably from the plane of these centers without diminishing the advantageous characteristics of the engagement between the cable and fixture, but the plane of the cable portions is preferably substantially at or near the plane of the centers of the radii of the partially circular groove.

Referring to Fig. 1, 11 illustrates a fixture of the type which might be called a guy bolt, as the eye structure is carried by the end of an elongated bolt 20, which in this case extends through a bore 21 in the pole. It has its threaded end 22 provided with a nut 23, which not only secures the fixture 11 to the pole, but serves for securing the fixture 10 to the pole also.

This guy bolt may also be used in a longer form as a guy rod, in which case the end opposite from the eye stretcher would be provided with a suitable pointed head or a threaded portion and nut, as shown in Fig. 1.

The eye structure of this eye bolt 11 is preferably formed with an annular shoulder at 24 for engaging the side of the pole or any other structure to which it is attached. The eye structure has a body which is substantially circular at its base adjacent the shoulder 24, and provided with an annular rib 25.

The yoke 14, which has been previously described, is supported by a pair of substantially triangular side portions 26, 27 (Fig. 3), each of which may be provided on each side, front, and back, with a reinforcing rib 28, which also serves as a border for the circular groove 14.

The rib 28 terminates in the body portion 29 of the fixture below the eye 15, which would be toward the left of the eye in Fig. 1. The eye 15 may be substantially circular in shape and of sufficient size to receive the cable that fits in the groove 14, but the eye is preferably made of irregular shape and larger than the cable. This irregular shape is made up of the circular curve 30 in the groove 14, and the circular curves 31, which are made with a slightly larger diameter. Thus the eye 15 is bigger than the cable so that it may be inserted in the portion 31 with less difficuty, but when the cable is drawn up it is drawn into the portion 30, which is substantially the same size as the cable, so that it gives the cable support and maintains it in circular shape.

The juncture of the triangular portions 26, 27 with the body 29 af the fixture 11 may be further strengthened by means of a longitudinally extending reinforcing rib 32 on each side, joining with the annular rib 25.

The annular shoulder 24 may be substantially frusto-conical, as shown in Fig. 2, so that the engagement of the shoulder 24 of the fixture with the wood fibers about the bore 21 will cause the loose cut ends of these fibers to be forced inward so as to prevent splintering, and provide a firm seat for the shoulder 24 against the side of the pole.

Referring to Fig. 1, the fixture 12 is of a different construction, adapted to be secured to a bolt 35 or similar securing device, which is carried in the bore 36. In this case the main body or base 37 of the fixture 12 may be substantially cylindrical in shape, and provided with a centrally located through bore 38 of suitable size to pass the threaded end 39 of the bolt 35 with a slight tolerance.

In this case the bolt 35 is also utilized to secure one of the attaching flanges of the fixture 10 to the pole, and it has its threaded end 39 provided with a nut 40 and located in the eye 16. The base 37 of this fixture may be provided with a pair of outwardly projecting integral arms 42, 43, each of which is provided with a substantially cylindrical outer surface 44, substantially flat edges 45, and an inner convex surface 46 formed by two plane surfaces.

The space between the inner surfaces 46 may be such that these shoulders 46 prevent rotation of the nut 40 within the eye 16. The base 37 may be formed with an inner substantially flat surface 48 for engaging the nut 40; and upon its lower side, that is, the left, in Fig. 1, it may be formed with a laterally curved end surface, conforming substantially to the average curvature of a pole 13, or it may be provided with a frusto-conical surface adapted to be forced into the wood of the pole.

The laterally projecting arms 42, 43 may extend outward from the base 37, but may be curved inwardly at 50 on each side, to join with the side plates 51, which support the yoke 14. Each of the side plate portions 51 is substantially circular in form at its outer end, and as indicated by the outline at 52 in Fig. 7. The side plate portions 51 are each provided with a continuous rib 52, 53, the rib extending from the base 37 along the arms 42, 43, and curving inward therewith to form the edge of the side plate portions 51.

In this case the eye 16 may be described as having a substantially rectangular central portion communicating with the partially circular grooved portion 30 into which the cable is drawn when slack is taken up.

The rectangular portion of the eye 16 permits the insertion of the nut 40, which is then engaged with the threaded end 39 of the bolt 35, and the bolt may be rotated by means of its opposite non-circular head 54. In this case also the supporting arms 42, 43 may be reinforced at each side by a rib 55, extending longitudinally of the fixture. This type of fixture is adapted to be used wherever it is to be attached to a bolt, the bolt having a nut at that end.

Referring now to the fixture 10 of Fig. 1, this is the type of fixture which may be attached to a pole by means of a plurality of eye bolts 11 or ordinary bolts 35, and it is adapted to support a guying cable at its lower end and a messenger cable at its intermediate portion.

This fixture is preferably provided with attaching flange portions 60 and 61. Each of these attaching flange portions is preferably provided with a laterally curved inner surface 63, 64, which is partially cylindrical and curved on a radius which is the average radius of the pole portions to which they are to be secured.

The attaching flange 60 (Fig. 5) may be provided with a centrally located oblong aperture 65, which has its longest dimension extending vertically. This aperture has a pair of straight sides 66 and the circular curved ends 67, and the tolerance which is permitted between the ends 67 and any attaching bolt 20 permits the fixture to be placed over the bolt, even though the bore through the pole may be slightly out of line in a vertical direction with another bore 36.

This oblong bore in the attaching flange permits some variance in the spacing between the attaching bolts. The boundary of the attaching flange 60 may be substantially circular at 68 and provided with a flattened end at 69.

At its outer side 70 each of the attaching flanges 60 and 61 may also be curved concentrically to the inner surfaces 63, 64, but each flange is preferably provided with a raised flat surface or rib 71, 72, surrounding the apertures 65 and 73. The aperture 73 is centrally located in the attaching flange 61, and may be of such size as to pass the securing bolt 35.

The two flanges 60 and 61 are joined to the yoke 14 by a pair of integral side plate portions 74, 75. These side plate portions may have substantially circular outer boundaries terminating in a pair of ribs 76, 77, one at each side of the circular groove 17.

The groove 17 receives the cable of substantially the same size, and the inner surfaces of the side plate portions 74, 75 may diverge, as at 79 and 80, toward the pole to form an aperture substantially larger than the cable which is to be received in the groove 17. Thus the cable may be easily inserted, and it will be drawn into the groove 17 when the slack is taken up.

In this embodiment the yoke 14 again prevents a sharp bend in the cable and maintains the cylindrical or round shape of the cable in such manner as to reduce the strains in the different strands of the cable and to reduce the tendency toward flattening. The two ends of the cable which extend from the yoke 14 may extend in any direction without affecting the curvature of the cable at the fixture, and thus the range of use of the fixture is greatly increased over prior devices which were so constructed that the cable must extend at substantially right angles to the axis of the fixture.

The lower attaching flange 61 in this embodiment also preferably supports a downwardly and outwardly extending eye structure for the purpose of engagement with a guying cable. For this purpose the attaching flange 61 is bent outward at 81 and terminates as a flat flange at 82, but is provided with a pair of substantially triangular side plate portions 83, 84, which are each preferably provided with a substantially circular boundary 85, terminating in the reinforcing ribs 86, 87.

These side plate portions are integrally joined to the yoke portion 14, which is again provided with the partially circular groove 17 of toroidal shape, and the side plate portions 83, 84 are separated by a through aperture or eye 88.

This eye is formed by the partially circular groove 17 at its lower side (Fig. 5), and it may have a pair of substantially flat side portions, 89, joined to a part which is circular in elevation at 90, but of a larger diameter than the circular groove 17. This provides an oblong aperture of larger size, having a clearance with a cable of such size that it fits in the circular groove 17.

The yoke 14 is preferably substantially circular in section, as shown in Fig. 6. Thus the cable ends may extend off at any direction from the yoke 14 without producing any sharp bends in the cable.

Referring to the modification which is shown in Figs. 16 to 18, this fixture is similar in construction to that of Fig. 5, except that it does not have the intermediate yoke between the two botls, and its attaching flanges are all formed in one integral flange 95 of tapered shape.

In this embodiment the attaching flange 95 has its upper aperture 96 of suitable size to receive the bolt 20, while the lower aperture 97 is larger to permit a little variation between the locations of the ends of the bolts.

The eye structure at the lower end of this fixture may be substantially similar to that shown in Fig. 5, except that the attaching flange is connected at each side to an integral reinforcing rib 98, which extends downward and outward, and has its end centrally located of the triangular side plates 83, 84. The body of this fixture is also strengthened by having the raised flat rib 99 under the lower bolt head extended in the form of a raised or thickened portion 100, downward toward the eye structure, which makes the body thicker at the point of attachment of the eye structure to the attaching flange 95.

Referring to the fixture shown in Figs. 19 to 21, the construction of this fixture is substantially identical to the upper part of the fixture of Fig. 5. In this case the shape of the lower attaching flange 61 is the same as that of the upper attaching flange 60.

This fixture is peculiarly adapted to be used for attaching a messenger cable to a pole by means of a pair of bolts or other threaded securing members. In this embodiment, the outer surface of the attaching flanges may be made plane at 105 (Fig. 21) for the purpose of increasing the strength of these flanges, while the inner surface is made partially cylindrical, as at 106.

Referring to the fixture shown at Figs. 10 to 12, this is another modification of a guying fixture having an eye structure 107 and an attaching flange 108. In this case the attaching flange 108 is substantially similar to the lower part of the attaching flange 95 of Fig. 16, and the eye structure may be similar to that shown at the lower part of Fig. 5. This guying fixture may be used wherever it is deemed that the support provided by a single attaching bolt is sufficient for withstanding the strain applied to the cable which is located in the eye structure 107.

Referring to Figs. 13 to 15, this is a modified form of eye structure which is adapted to be secured to the threaded end of a guy rod, with or without the use of a nut. In this embodiment the base or body portion of the eye structure is substantially cylindrical, but may be provided with a projecting circular rib 111 adjacent the body; that is, the left in Fig. 14.

The end or bottom surface may be plane or slightly frusto-conical at 112. The base 110 supports a pair of upwardly projecting arms 113, 114, and in order to increase the strength of these arms they may be made substantially triangular, as shown in Fig. 15, and provided with outwardly projecting ribs 116, 117.

The arms 113, 114 may terminate in side plate portions 118, 119, which are integrally joined to the intermediate yoke 120. The yoke 120 is substantially circular, as shown in Fig. 14, and is formed with a groove 121 of partially circular cross section. At each side of the groove 121 there may be an outwardly projecting rib 122, 123, and the rib may extend from the base 110 at each side of the aperture 124, about each of the plate portions 118, 119, and down to the base on the other side, the rear side of Fig. 13 being identical in appearance.

The base 110 is formed with an axially located through bore 125, which is provided with threads adapted to be engaged with the threads of a bolt or guy rod. Thus the present eye structure is adapted to be attached to any threaded rod. The eye opening 124 preferably has a substantially flat bottom wall 126 and a pair of flat side walls 127, 128.

From the flat side walls 127, 128 the walls 129, 130 taper towards the circular curved surface or groove 121. Thus the eye opening 124 is of sufficient size to pass a cable easily, even when a bolt protrudes into the opening 124, or when there is a nut in the opening; but the cable is drawn down into the circular groove 121 when the slack is taken up, and the groove is a substantial fit with the cable.

The substantially rectangular portion of the eye opening at 127, 128 permits the insertion of a nut, if desired. In some embodiments of the invention the present eye structure may be utilized with a smaller rod and nut instead of a rod fitting the threaded bore 125, or the bore may not be threaded.

In this embodiment as well, the cable may extend off in any direction from the yoke 120 without producing any sharp bends. This is possible because the yoke 120 is fully circular and of a larger diameter than the cable so as to prevent sharp bends in the cable.

The examples of the installations shown in Fig. 1 are merely illustrative of a few of the uses of the present fixtures. Many different types of guying installations and messenger cables may be attached to poles, buildings, logs, or other structures, by means of the present fixtures.

The present fixtures enable the use of cables extending in practically any direction with respect to the locations of the securing bolts. The present constructions are very sturdy and adapted to be manufactured at a low cost, and they are stronger than any of the devices of the prior art used for the same purposes.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. A pole guy fixture having means for attachment to a fixed body, comprising a pair of supporting side portions joined together by an integral yoke, said yoke being of substantially greater diameter than the diameter of a cable to be used with the fixture, and being substantially circular in cross section, said yoke having about its periphery a partially circular groove adapted to receive a cable of such size as to fit substantially in the groove, the walls of said groove supporting the sides of the cable against flattening, to diminish the inequality of strains on the strands of the cable, irrespective of the direction in which the parts of the cable extend from the fixture.

2. A pole guy fixture having means for attachment to a fixed body, comprising a pair of supporting side portions joined together by an integral yoke, said yoke being of substantially greater diameter than the diameter of a cable to be used with the fixture, and being substantially circular in cross section, said yoke having about its periphery a partially circular groove adapted to receive a cable of such size as to fit substantially in the groove, the walls of said groove supporting the sides of the cable against flattening, to diminish the inequality of strains on the strands of the cable, at all points of engagement between the cable and the fixture, over the periphery of the yoke.

3. A pole guy fixture having means for attachment to a fixed body, comprising a pair of supporting side portions joined together by an integral yoke, said yoke being of substantially greater diameter than the diameter of a cable to be used with the fixture, and being substantially circular in cross section, said yoke having about its periphery a partially circular groove adapted to receive a cable of such size as to fit substantially in the groove, the walls of said groove supporting the sides of the cable against flattening, to diminish the inequality of strains on the strands of the cable, irrespective of the direction in which the parts of the cable extend from the fixture, one of said side portions being carried by a laterally projecting attaching flange, having an aperture for receiving a bolt or the like.

4. A pole guy fixture having means for attachment to a fixed body, comprising a pair of supporting side portions joined together by an integral yoke, said yoke being of substantially greater diameter than the diameter of a cable to be used with the fixture, and being substantially circular in cross section, said yoke having about its periphery a partially circular groove adapted to receive a cable to such size as to fit substantially in the groove, the walls of said groove supporting the sides of the cable against flattening, to diminish the inequality of strains on the strands of the cable, irrespective of the direction in which the parts of the cable extend from the fixture, both of said side portions having laterally and oppositely turned attaching flanges provided with apertures for receiving bolts or the like.

5. A pole guy fixture having means for attachment to a fixed body, comprising a pair of supporting side portions joined together by an integral yoke, said yoke being of substantially greater diameter than the diameter of a cable to be used with the fixture, and being substantially circular in cross section, said yoke having about its periphery a partially circular groove adapted to receive a cable to such size as to fit substantially in the groove, the walls of said groove supporting the sides of the cable against flattening, to diminish the inequality of strains on the strands of the cable, irrespective of the direction in which the parts of the cable extend from the fixture, both of said side portions having laterally and oppositely turned attaching flanges provided with apertures for receiving bolts or the like, and one of said attaching flanges having a depending pair of supporting plate portions arranged in planes transverse to the attaching flanges, said latter plate portions supporting a yoke of similar structure to the first-mentioned yoke.

6. A pole guy fixture having means for attachment to a fixed body, comprising a pair of supporting side portions joined together by an integral yoke, said yoke being of substantially greater diameter than the diameter of a cable to be used with the fixture, and being substantially circular in cross section, said yoke having about its periphery a partially circular groove adapted to receive a cable of such size as to fit substantially in the groove, the walls of said groove supporting the sides of the cable against flattening, to diminish the inequality of strains on the strands of the cable, irrespective of the direction in which the parts of the cable extend from the fixture, said supporting side portions being integrally joined to a substantially circular base, there being an eye between said yoke and said base, and said base being formed with a centrally located aperture.

7. A pole guy fixture having means for attachment to a fixed body, comprising a pair of supporting side portions joined together by an integral yoke, said yoke being of substantially greater diameter than the diameter of a cable to be used with the fixture, and being substantially circular in cross section, said yoke having about its periphery a partially circular groove adapted to receive a cable of such size as to fit substantially in the groove, the walls of said groove supporting the sides of the cable against flattening, to diminish the inequality of strains on the strands of the cable, irrespective of the direction in which the parts of the cable extend from the fixture, said supporting side portions being integrally joined to a substantially circular base, there being an eye between said yoke and said base, and said base being formed with a centrally located aperture, said eye being of sufficient size to receive a nut carried by a bolt extending through said aperture.

8. A pole guy fixture having means for attachment to a fixed body, comprising a pair of supporting side portions joined together by an integral yoke, said yoke being of substantially greater diameter than the diameter of a cable to be used with the fixture, and being substantially circular in cross section, said yoke having about its periphery a partially circular groove adapted to receive a cable of such size as to fit substantially in the groove, the walls of said groove supporting the sides of the cable against flattening, to diminish the inequality of strains on the strands of the cable, irrespective of the direction in which the parts of the cable extend from the fixture, said supporting side portions being integrally joined to a substantially circular base, there being an eye between said yoke and said base, and said base being formed with a centrally located aperture, said through aperture being threaded to receive the threaded end of a bolt or the like.

9. A pole guy fixture having means for attachment to a fixed body, comprising a pair of supporting side portions joined together by an integral yoke, said yoke being of substantially greater diameter than the diameter of a cable to be used with the fixture, and being substantially circular in cross section, said yoke having about its periphery a partially circular groove adapted to receive a cable of such size as to fit substantially in the groove, the walls of said groove supporting the sides of the cable against flattening, to diminish the inequality of strains on the strands of the cable, irrespective of the direction in which the parts of the cable extend from the fixture, said supporting side portions being integrally joined to a base portion having an annular shoulder surrounding an outwardly projecting bolt.

10. A pole guy fixture having means for attachment to a fixed body, comprising a pair of supporting side portions joined together by an integral yoke, said yoke being of substantially greater diameter than the diameter of a cable to be used with the fixture, and being substantially circular in cross section, said yoke having about its periphery a partially circular groove adapted to receive a cable of such size as to fit substantially in the groove, the walls of said groove supporting the sides of the cable against flattening, to diminish the inequality of strains on the strands of the cable, at all points of engagement between the cable and the fixture, over the periphery of the yoke, said supporting side portions being integrally joined to an attaching flange extending in a plane substantially transverse to the supporting side portions.

11. A pole guy fixture having means for attachment to a fixed body, comprising a pair of supporting side portions joined together by an integral yoke, said yoke being of substantially greater diameter than the diameter of a cable to be used with the fixture, and being substantially circular in cross section, said yoke having about its periphery a partially circular groove adapted to receive a cable of such size to to fit substantially in the groove, the walls of said groove supporting the sides of the cable against flattening, to diminish the inequality of strains on the strands of the cable, at all points of engagement between the cable and the fixture, over the periphery of the yoke, said supporting side portions being integrally joined to an attaching flange extending in a plane substantially transverse to the supporting side portions, said supporting flange being laterally curved to engage a cylindrical pole and having an aperture for a through bolt.

12. A pole guy fixture having means for attachment to a fixed body, comprising a pair of supporting side portions joined together by an integral yoke, said yoke being of substantially greater diameter than the diameter of a cable to be used with the fixture, and being substantially circular in cross section, said yoke having about its periphery a partially circular groove adapted to receive a cable of such size as to fit substantially in the groove, the walls of said groove supporting the sides of the cable against flattening, to diminish the inequality of strains on the strands of the cable, at all points of engagement between the cable and the fixture, over the periphery of the yoke, said supporting side portions being integrally joined to an attaching flange extending in a plane substantially transverse to the supporting side portions, said supporting flange being laterally curved to engage a cylindrical pole and having an aperture for a through bolt, said attaching flange being elongated and formed with a pair of through apertures for receiving through bolts to attach the fixture to a support.

13. In a pole guy fixture, the combination of a pair of supporting side portions joined together by an integral yoke, said integral yoke being of substantially circular cross section, and said yoke having its periphery formed with a partially circling groove adapted to receive a cable of such size as to fit substantially in the groove, means for attaching said side portions to a fixed support, the walls of said groove supporting the sides of said cable against flattening, and said yoke of circular cross section maintaining a relatively easy bend in a cable engaging said yoke, irrespective of the direction in which the parts of a cable extend from said fixture.

ALBERT B. CHANCE.